Patented July 25, 1933

1,920,008

UNITED STATES PATENT OFFICE

MAX ENGELMANN, OF WILMINGTON, DELAWARE, ASSIGNOR TO BAYER-SEMESAN COMPANY, OF WILMINGTON, DELAWARE, A CORPORATION OF DELAWARE

SEED DISINFECTANT

No Drawing.   Application filed July 25, 1929.  Serial No. 381,081.

This invention relates to a process of making dust disinfectants containing mercury, and more particularly to a process of making dust disinfectants containing organic mercury compounds in a one-step process.

In my copending application, Serial No. 257,544, filed February 27, 1928, I have described a process of making dust disinfectants containing an organic mercury compound in a one-step process, by interaction of mercury salts and hydrocarbon derivatives of a metal that occurs above mercury in the electromotive series, in the absence of a liquid diluent.

An object of my present invention is an improved and more simplified process than has hitherto been known. A further object of my invention is a process requiring less time in the preparation of these organic mercury compounds by a one-step process than has been the practice heretofore. Other objects will appear as the description proceeds.

I have now discovered that in making these organic mercury compounds, the process can be materially improved by replacing the already made mercury salt by a mixture of mercury oxide and an acid, or an acid salt. In carrying out my present invention I have found that it is unnecessary to prepare the mercury salt which in most cases can only be made from mercury oxide, or by a double exchange of a soluble mercury salt with an alkali salt. I have also found that the time of grinding the materials can likewise be reduced on account of the increased reactivity of the mixture of mercury oxide and the acid.

As further illustrating my invention the following examples are given as specific embodiments of my present invention, but it will be understood that these examples are for illustrative purposes merely and are not to be taken in any way as a limitation of my invention:

Example I 108 parts of mercuric oxide and 81 parts of lead tetra ethyl are intimately mixed with 120 parts of sodium acid sulfate and 691 parts of dehydrated sodium sulfate. After thoroughly mixing in a ball mill which only requires about 4 hours, the product is ready for use as a disinfectant.

Example II 21.6 parts of mercuric oxide and 24.4 parts of benzoic acid are agitated in a ball mill with 13.3 parts of lead tetra methyl and 940.7 parts of clay at room temperature for about 10 hours. This material is then ready for use as a disinfectant particularly adapted for the control of seed and plant diseases.

Example III 20 parts of hydrochloric acid (commercial product with 37% HCl) are intimately mixed with 925.4 parts of infusorial earth for about one-half hour. To this material is then added 21.6 parts of mercuric oxide and 33 parts of tri-ethyl lead chloride and agitated in a ball mill for 4 hours more. When the reaction is finished, the dry powder is discharged from the mixer and is ready for use.

Example IV 21.6 parts of mercuric oxide and 9 parts of tetra methyl tin are thoroughly mixed with 13 parts of oxalic acid and 946.4 parts of charcoal. The reaction is finished after about 12 hours. The product can be used immediately as a seed disinfectant.

In place of the tetra ethyl lead, tetra methyl lead and tetra methyl tin disclosed above, I may use any of the hydrocarbon derivatives of metals that occur above mercury in the electromotive series and particularly those that occur above hydrogen. I may also use compounds such, for example, as phenyl, methyl, ethyl, etc., and derivatives of such materials as bismuth, zinc, magnesium, etc. I have found the alkyl derivatives of lead such as tetra methyl or tetra ethyl lead particularly well suited to my purpose.

In place of the free acids or acid salts, I may use also acid salts of weak basic materials, such for example, as urea nitrate, aniline hydrochloride, and like compounds. It will be understood that other equivalents of these acid materials exist and may be used within the scope of my invention.

It will be apparent from the foregoing that the preparation of these compounds may be varied widely without departing from the spirit of my invention. For example, I may prepare the mercury compounds free from diluents by this process, although I ordinarily prefer to have one or more finely divided solid diluents in the combination.

These disinfecting materials can be used in combination with other disinfectants such as copper salts, metallic mercury, organic or inorganic mercury salts, organic mercury compounds other than hydrocarbon derivatives like mercurized nitro and chlorophenols, etc. They may be applied also in combination with insecticides like arsenicals, nicotine preparations and the like.

Where, in the claims, I use the term "hydrocarbon derivative" I wish to be understood as covering the alkyl, aryl, and aralkyl derivatives of the compounds covered by the disclosure.

I claim:

1. A process of making dust-like disinfectant compositions containing mercury which comprises effecting a reaction by intimate contact between mercuric oxide, an acid material (taken from a group consisting of a free acid and an acid salt), and a hydrocarbon derivative of a metal that occurs above mercury in the electromotive series, in the absence of a liquid diluent.

2. A process of making dust-like disinfectant compositions containing mercury which comprises effecting a reaction by intimate contact between mercuric oxide, an acid material (taken from a group consisting of a free acid and an acid salt) and a tetra hydrocarbon derivative of a tetra valent metal lying above hydrogen in the electromotive series, in the absence of a liquid diluent.

3. A process of making dust-like disinfectant compositions containing mercury which comprises effecting a reaction by intimate contact between mercuric oxide, an acid material (taken from a group consisting of a free acid and an acid salt), and a hydrocarbon derivative of tetra valent lead, in the absence of a liquid diluent.

4. A process of making dust-like disinfectant compositions containing mercury which comprises effecting a reaction by intimate contact between mercuric oxide, an acid material (taken from a group consisting of a free acid and an acid salt), and an alkyl derivative of tetra valent lead, in the absence of a liquid diluent.

5. A process of making dust-like disinfectant compositions containing mercury which comprises effecting a reaction by intimate contact between mercuric oxide, an acid material (taken from a group consisting of a free acid and an acid salt), and tetra ethyl lead, in the absence of a liquid diluent.

MAX ENGELMANN.